(12) United States Patent
Suzuki

(10) Patent No.: US 9,558,780 B2
(45) Date of Patent: Jan. 31, 2017

(54) LIBRARY DEVICE AND ACCESSOR DEVICE

(75) Inventor: Takeshi Suzuki, Tokyo (JP)

(73) Assignee: NEC Platforms, Ltd., Kawasaki-shi, Kanagawa (JP)

( * ) Notice: Subject to any disclaimer, the term of this patent is extended or adjusted under 35 U.S.C. 154(b) by 0 days.

(21) Appl. No.: 13/985,426

(22) PCT Filed: Jan. 20, 2012

(86) PCT No.: PCT/JP2012/051162
§ 371 (c)(1),
(2), (4) Date: Aug. 14, 2013

(87) PCT Pub. No.: WO2012/132502
PCT Pub. Date: Oct. 4, 2012

(65) Prior Publication Data
US 2013/0328469 A1    Dec. 12, 2013

(30) Foreign Application Priority Data

Mar. 31, 2011 (JP) .................................. 2011-078556

(51) Int. Cl.
| | |
|---|---|
| *G11B 17/04* | (2006.01) |
| *G11B 15/68* | (2006.01) |
| *G11B 17/22* | (2006.01) |
| *G11B 17/041* | (2006.01) |
| *G11B 17/28* | (2006.01) |

(52) U.S. Cl.
CPC ............ *G11B 15/68* (2013.01); *G11B 15/6835* (2013.01); *G11B 17/041* (2013.01); *G11B 17/22* (2013.01); *G11B 17/225* (2013.01); *G11B 17/28* (2013.01)

(58) Field of Classification Search
CPC ...... G11B 17/041; G11B 17/22; G11B 17/225
USPC .......................... 360/98.04, 98.06; 369/30.43
See application file for complete search history.

(56) References Cited

U.S. PATENT DOCUMENTS

| | | | |
|---|---|---|---|
| 5,220,548 A | * | 6/1993 | Nakatsukasa ........ G11B 17/225 369/30.45 |
| 5,544,146 A | | 8/1996 | Luffel et al. |
| 5,793,714 A | | 8/1998 | Inoue et al. |

(Continued)

FOREIGN PATENT DOCUMENTS

| | | |
|---|---|---|
| GB | 877173 | 9/1961 |
| JP | 1-113854 U | 7/1989 |

(Continued)

OTHER PUBLICATIONS

International Search Report for PCT/JP2012/051162, dated Feb. 21, 2012.

(Continued)

*Primary Examiner* — Jefferson Evans
(74) *Attorney, Agent, or Firm* — Sughrue Mion, PLLC

(57) ABSTRACT

A library device includes: a housing having a substantially rectangular parallelepiped shape, the housing having a first surface and a second surface differing from each other; a first track that is provided within the housing, the first track extending along the first surface; a second track that is provided within the housing, the second track extending along the second surface, the second track being parallel with the first track; and an accessor device that includes a first portion engaging with the first track, and a second portion engaging with the second track.

11 Claims, 6 Drawing Sheets

(56) References Cited

U.S. PATENT DOCUMENTS

| | | | |
|---|---|---|---|
| 6,438,623 B1* | 8/2002 | Ryan | 710/2 |
| 6,449,223 B1 | 9/2002 | Kanetsuku et al. | |
| 7,782,565 B2* | 8/2010 | Starr | 360/92.1 |
| 7,800,860 B2* | 9/2010 | Steinhilber | 360/92.1 |
| 7,876,525 B2* | 1/2011 | Wilkin et al. | 360/92.1 |
| 2002/0181341 A1* | 12/2002 | Steinhilber | G11B 17/225 369/30.39 |
| 2004/0008445 A1* | 1/2004 | Vanderheyden | G11B 15/6835 360/92.1 |
| 2005/0063802 A1 | 3/2005 | Luffel | |
| 2006/0190951 A1* | 8/2006 | Fairchild | G11B 15/6835 720/632 |
| 2008/0282281 A1* | 11/2008 | White | G11B 15/6835 720/728 |
| 2009/0147398 A1* | 6/2009 | Nave et al. | 360/92.1 |
| 2010/0103558 A1* | 4/2010 | Sudou | G11B 15/6835 360/132 |
| 2011/0085263 A1* | 4/2011 | Hashimoto | 360/92.1 |
| 2013/0322223 A1* | 12/2013 | Minemura | G11B 33/04 369/75.11 |

FOREIGN PATENT DOCUMENTS

| | | |
|---|---|---|
| JP | 06-168532 A | 6/1994 |
| JP | 10-21345 A | 1/1998 |
| JP | 11-167757 A | 6/1999 |
| JP | 2003-59249 A | 2/2003 |
| JP | 2005-209282 A | 8/2005 |
| JP | 2006-4573 A | 1/2006 |
| JP | 3129672 U | 3/2007 |
| JP | 2008-310934 A | 12/2008 |
| WO | 2005/013279 A1 | 2/2005 |

OTHER PUBLICATIONS

Communication dated Oct. 21, 2014, issued by the European Patent Office in counterpart Application No. 12764235.3.

Communication dated Jul. 15, 2014 from the Japanese Patent Office in counterpart application No. 2011-078556.

* cited by examiner

LIBRARY DEVICE AND ACCESSOR DEVICE

CROSS REFERENCE TO RELATED APPLICATIONS

This application is a National Stage of International Application No. PCT/JP2012/051162 filed Jan. 20, 2012, claiming priority based on Japanese Patent Application No. 2011-078556 filed Mar. 31, 2011, the contents of all of which are incorporated herein by reference in their entirety.

TECHNICAL FIELD

The present invention relates to a library device and an accessor device. The present invention relates, in particular, to collapse prevention of an accessor device.

BACKGROUND ART

For example, as shown in Patent Document 1, there has been known a library device (also referred to as a data storage system or the like in some cases) which stores data cartridges within a plurality of cells. FIG. 6 is an example showing an external perspective view of a conventional library device.

As shown in FIG. 6, a library device 200 has magazines 260, drive devices 250, and an accessor device 240. The magazines 260 have a plurality of cells 280 for accommodating data cartridges in a horizontal attitude. The drive device 250 reads and writes data from and onto a recording medium within the data cartridge. The accessor device 240 transports data cartridges. The two magazines 260 are arranged in directions in which opening parts of the cells 280 oppose each other. The accessor device 240 has a picker mechanism (not shown in the figure) which take data cartridges in and out, and a swivel mechanism (not shown in the figure) for rotating the picker mechanism.

In general, an accessor device which transports data cartridges of a library device takes out a data cartridge from a drive device or a cell, and returns the data cartridge to the drive device. At this time, the accessor device pulls or pushes with a force that withstands the retentive force of the data cartridge or the resistance between the data cartridge and the drive device or the cell. Therefore, the accessor device requires a level of rigidity that withstands these forces. If the accessor device does not have this level of rigidity, it may not be able to pull out or return the data cartridge from or into the drive device and the cell in some cases.

If the height of the library device becomes high, the accessor device may collapse due to the above relationship of force in some cases, when the accessor device is operating to pull out or return the data cartridge. In order to perform these operations stably, there has been proposed a structure that is provided with a guide (refer to FIG. 3 of Patent Document 2). This type of structure has an extra structure added thereto compared to conventional structures. As a result, as a whole library device, this may cause the structure to become more complex and more large-scale.

In the accessor device of Patent Document 1, in order to realize stable operations of pulling out and returning a data cartridge without a guide, there is provided a structure in which the level of rigidity of the accessor device is made higher. This type of structure, compared to conventional structures, leads to a weight increase of the accessor device and limitation of materials to be used.

PRIOR ART DOCUMENT

Patent Document

[Patent Document 1] Japanese Unexamined Patent Application, First Publication No. 2005-209282

[Patent Document 2] Japanese Unexamined Patent Application, First Publication No. H11-167757

SUMMARY OF THE INVENTION

Problem to be Solved by the Invention

There exists a library device with a structure in which cells are made in a multi-stage and multi-level manner for storing a large number of data cartridges. Recent library devices are required to be more compact and more lightweight. For this reason, providing a guide such as one described above or increasing the level of rigidity becomes a problem for achieving such compaction and weight reduction.

Consequently, an exemplary object of the present invention is to provide a library device and an accessor device capable of realizing compaction and weight reduction of the library device, and stably performing operations of pulling out and returning a data cartridge.

Means for Solving the Problem

A library device according to the present invention includes: a housing having a substantially rectangular parallelepiped shape, the housing having a first surface and a second surface differing from each other; a first track that is provided within the housing, the first track extending along the first surface; a second track that is provided within the housing, the second track extending along the second surface, the second track being parallel with the first track; and an accessor device that includes a first portion engaging with the first track, and a second portion engaging with the second track.

Effect of the Invention

According to the present invention, it is possible to realize compaction and weight reduction of the library device. According to the present invention, furthermore, it is possible to stably perform operations of pulling out and returning a data cartridge.

EMBODIMENTS FOR CARRYING OUT THE INVENTION

Hereunder, an exemplary embodiment of the present invention is described in detail, with reference to the drawings.

Figure 1:
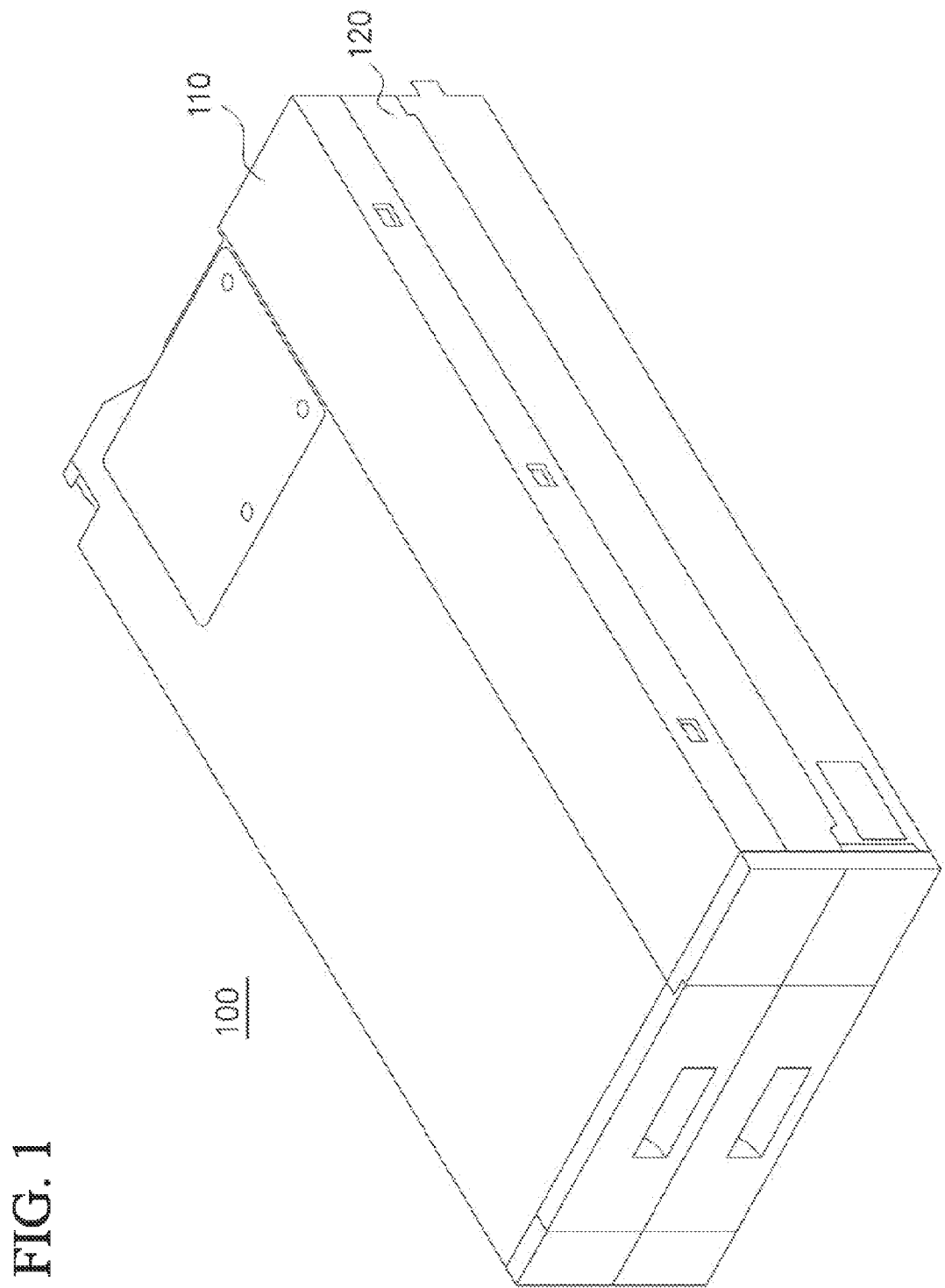
FIG. 1 is an external perspective view of a library device according to an exemplary embodiment of the present invention.

FIG. 1 is an external perspective view of a library device 100 according to an exemplary embodiment of the present invention. The library device (that is, the housing of the library device) 100 has a substantially rectangular parallelepiped shape. The library device 100 has a top cover 110 that covers an upper part, and a side cover 120 that covers a part of a side surface. In this exemplary embodiment, the top cover 110 has an inverted U-shape.

Figure 2:
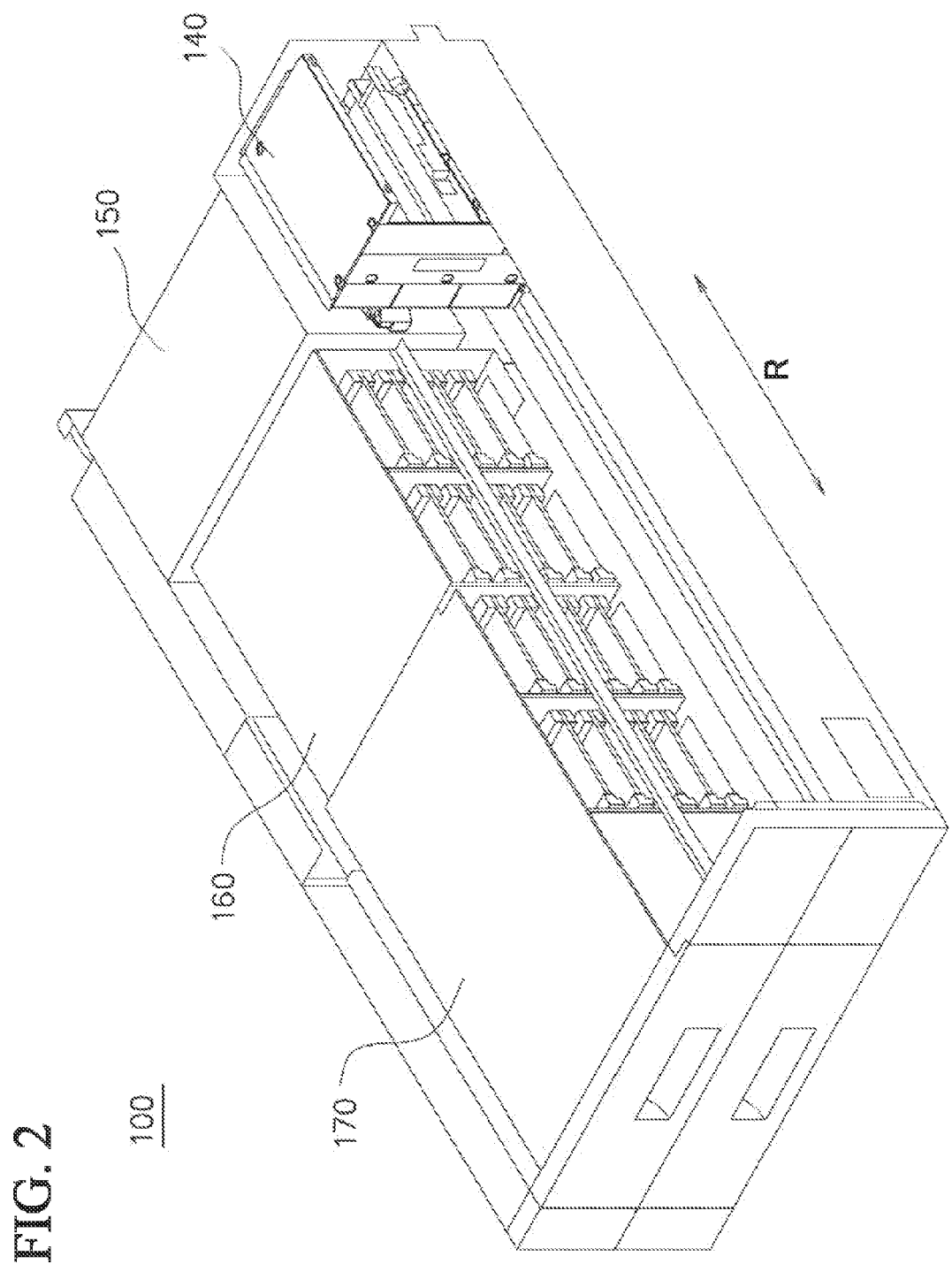
FIG. 2 is a perspective view of an internal structure of the library device according to the exemplary embodiment of the present invention.

FIG. 2 is a perspective view of an internal structure of the library device 100 according to the exemplary embodiment of the present invention. The top cover 110 and the side cover 120 are removed so that the interior of the library device 100 can be seen. The library device 100 is configured by an accessor device 140, a drive device 150, and magazines 160 and 170.

The accessor device 140 moves in the direction of arrow R. The accessor device 140 transports data cartridges stored in the magazines 160 and 170 to the drive device 150, and inserts them into the drive device 150. The drive device 150 reads and writes data from and onto a recording medium within the data cartridge. The data cartridge, from or onto which data reading or data writing has been performed, is transported by the accessor device 140 to either one of the magazines 160 and 170, and stored.

On the bottom surface (first surface) of the library device 100, there is provided a rail-shaped regulating part (first track) 101. The regulating part 101 is provided along the direction of arrow R (refer to FIG. 2). The regulating part 101 regulates the movement direction of the accessor device 140. On the bottom surface of the accessor device 140, there is provided an engaging part (first portion) 141 that engages with the regulating part 101. The engaging part 141 is provided along the direction of arrow R. With the engaging part 141 engaging with the regulating part 101, the accessor device 140 moves along the regulating part 101. Cells are equipped in a multi-stage manner within the magazines 160 and 170. In order to access the data cartridge of each cell, a picker mechanism (not shown in the figure) that moves vertically is provided within the accessor device 140.

Figure 3:
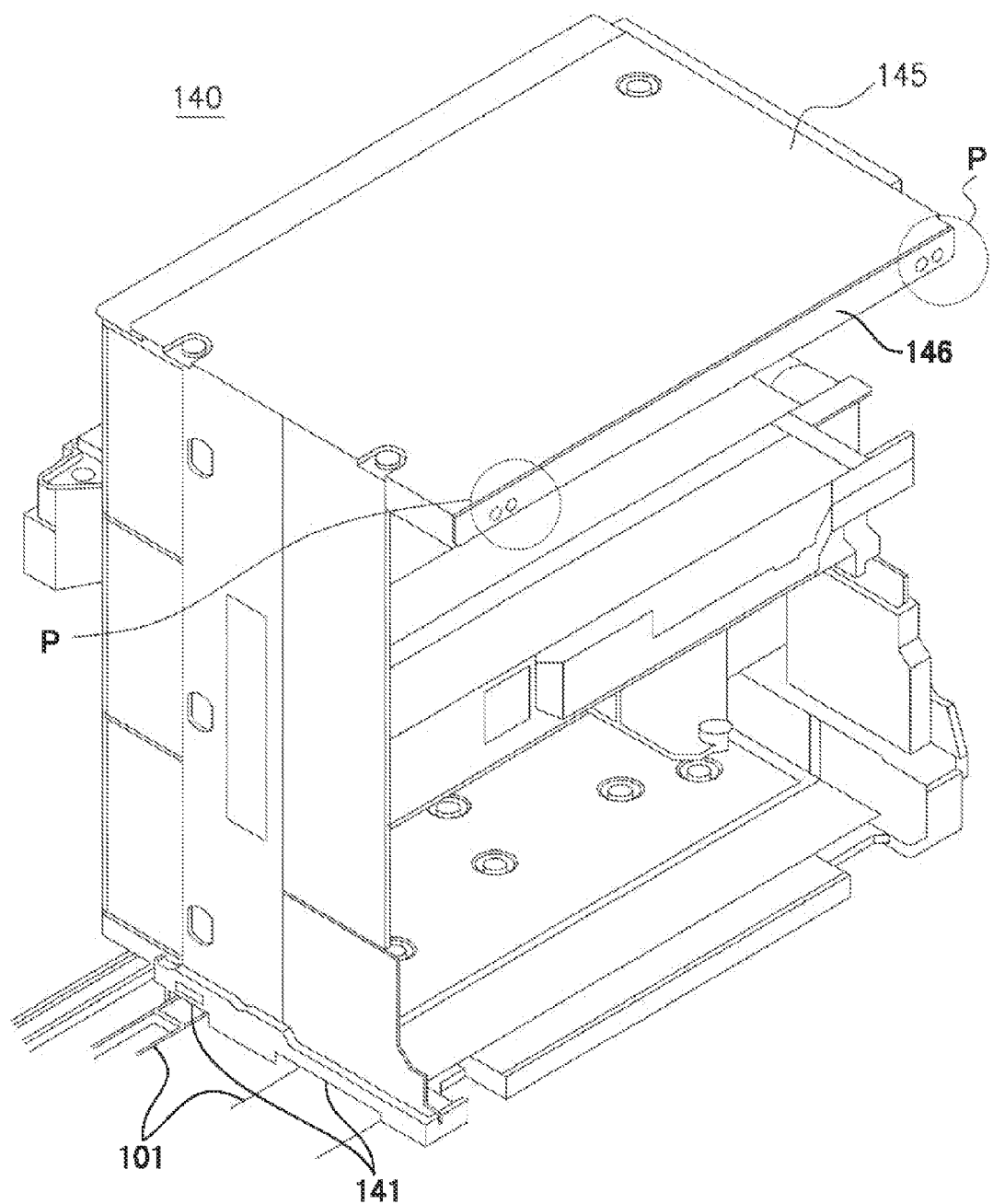
FIG. 3 is a perspective view of an accessor device according to the exemplary embodiment of the present invention.
Figure 4:
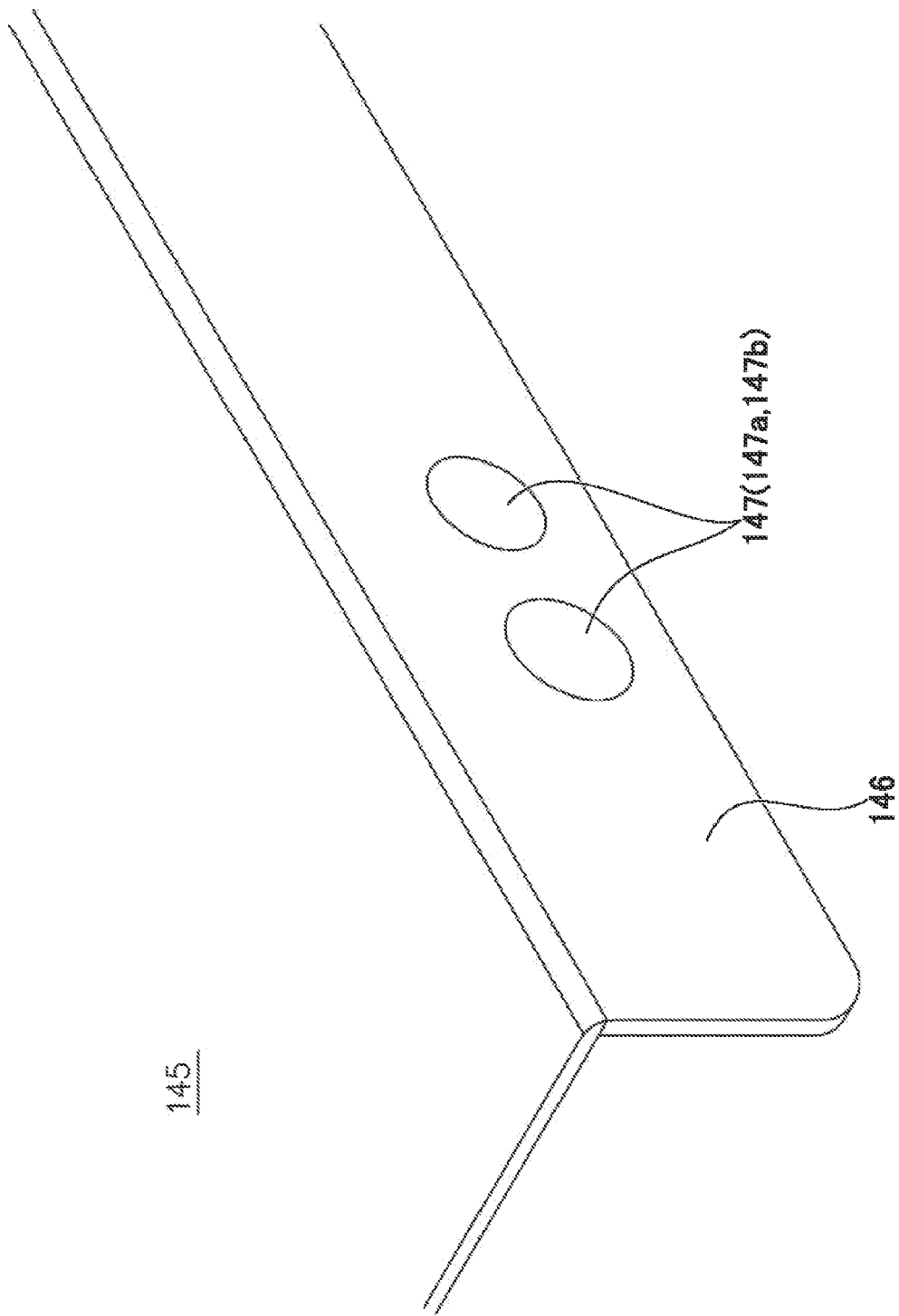
FIG. 4 is a diagram showing a depression and projection shape of a top plate of the accessor device according to the exemplary embodiment of the present invention.
Figure 5:
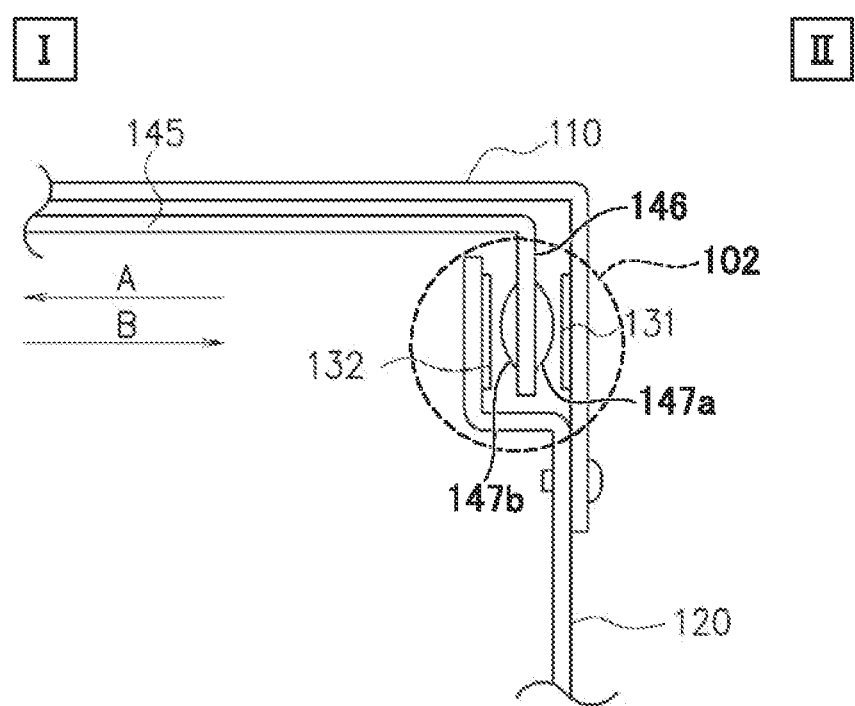
FIG. 5 is a diagram showing a structure of the top plate of the accessor device and a top cover and a side cover of the library device, according to the exemplary embodiment of the present invention.
Figure 6:
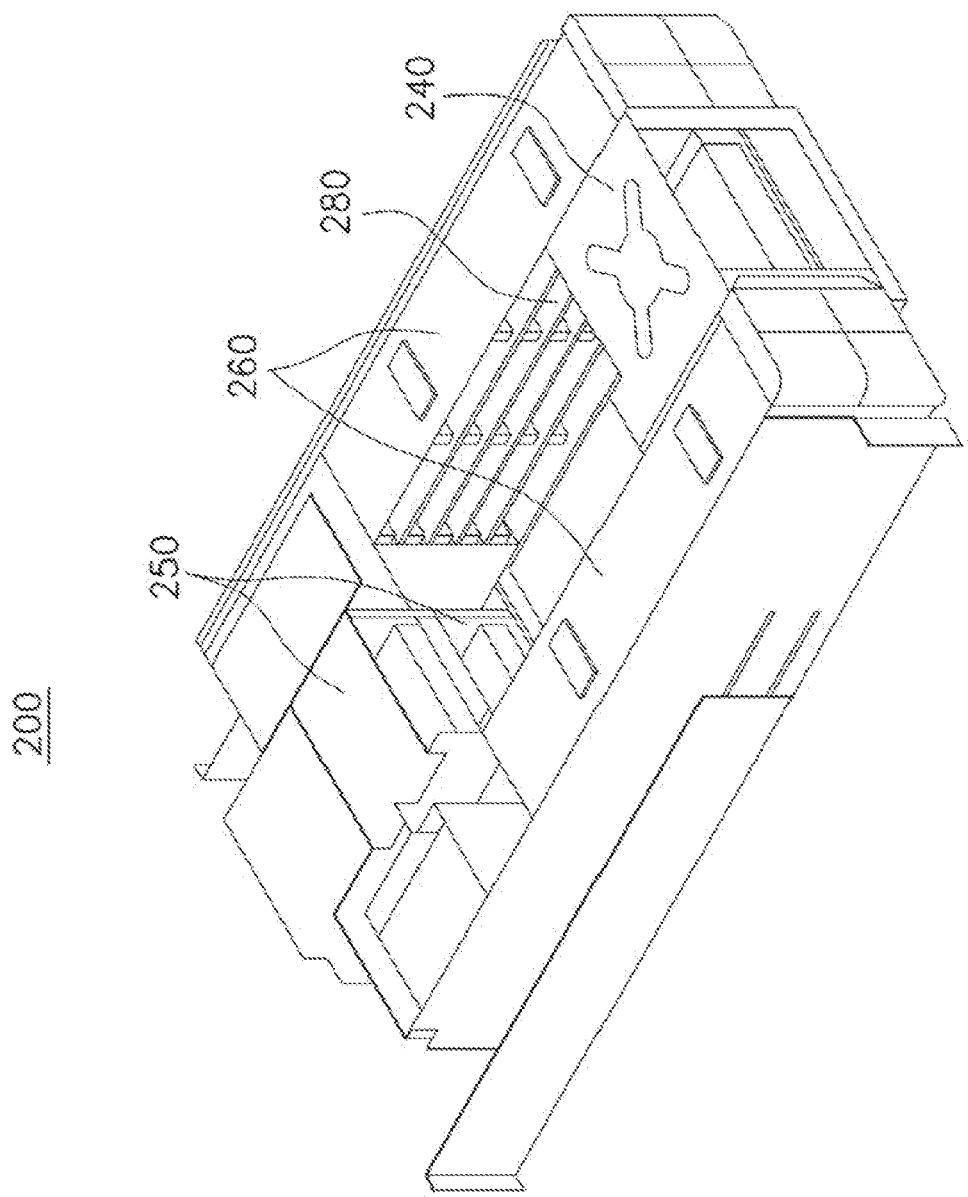
FIG. 6 is an external perspective view of a conventional library device.

FIG. 3 is an external perspective view of the accessor device 140 according to the exemplary embodiment of the present invention. In the upper part of the accessor device 140, there is provided a top plate 145. This top plate 145 has an edge face (second portion) 146 that is provided along the side surface (second surface) of the library device 100. This edge face 146 is formed in a manner such that the edge face of the top plate 145 positioned on the side surface side of the library device 100 is bent. As shown in FIG. 3 through FIG. 5, on the outer side surface of the edge face 146, there are formed first projection parts 147*a* that protrude outward. On the inner side surface of the edge face 146, there are formed second projection parts 147*b* that protrude outward. The first projection part 147*a* and the second projection part 147*b* may be formed so as to oppose each other while sandwiching the edge face 146 therebetween. A single first projection part 147*a* and a single second projection part 147*b* that oppose each other, form a set of projection parts 147. Two sets of projection parts 147 are provided in two positions in the front-rear direction (arrow R direction) (refer to portion P in FIG. 3). Between the two first projection parts 147*a*, there is formed a relative recess. Similarly, between the two second projection parts 147*b*, there is formed a relative recess. As a result, the two sets of projection parts 147 form a single set depression and projection shape. The number and locations of the projection parts 147 are not limited to those of this exemplary embodiment.

FIG. 4 is a diagram showing the depression and projection shape of the top plate 145 of the accessor device 140 according to the exemplary embodiment of the present invention. With the structure having this depression and projection shape provided therein, when the accessor device 140 moves within the library device 100, frictional force that occurs when the top plate 145 comes in contact with the top cover 110 and the side cover 120 is reduced. This frictional force is described in detail, with reference to FIG. 5.

FIG. 5 is a diagram showing the structure of the top plate 145 of the accessor device 140 and the top cover 110 and the side cover 120 of the library device 100, according to the exemplary embodiment of the present invention. Reference symbol I denotes the drive device 150 side and the cell side. Reference symbol II denotes the library device 100 side. FIG. 5 is a cross-sectional view of the vicinity of the upper part of the accessor device 140 and the upper part of the library device 100, seen from the movement direction (the direction of arrow R in FIG. 2) of the accessor device 140 in FIG. 2.

As described with reference to FIG. 2, the accessor device 140 moves in the arrow R direction of FIG. 2 within the library device 100. At this time, as shown in FIG. 5, the top plate 145 of the accessor device 140 is in a state of engaging with a channel part (second track) 102 that is formed by the top cover 110 and the side cover 120 of the library device 100. The channel part 102 extends along the side surface of the library device 100, and is parallel with the regulating part 101. The regulating part 101 and the channel part 102 do not exist on the same plane within the library device 100. On the top cover 110 and the side cover 120 there are attached guide sheets 131 and 132. These guide sheets 131 and 132 are plastic sheets composed of a material such as PET (abbreviation for polyethylene terephthalate) and fluorine resin. As a result, when the accessor device 140 moves within the library device 100, the top plate 145 of the accessor device 140 and the top cover 110 and the side cover 120 of the library device 100 slide on each other. However, friction between the metal that may occur at this time can be prevented.

In the operations of pulling out or returning a data cartridge from or into the drive device or the cell, the accessor device 140 is such that the top plate 145 of the accessor device 140 moves in the direction of arrow A or the direction of arrow B as a force acts in the direction of arrow A or the direction of arrow B in FIG. 5. When the data cartridge is pulled out from the drive device 150 or from the cell, it moves in the direction of arrow A. When the data cartridge is returned into the drive device 150 or from the cell, it moves in the direction of arrow B. When the top plate 145 of the accessor device 140 moves in the direction of arrow A or B, the top cover 110 and the side cover 120 of the library device 100 guide the accessor device 140, and hence it becomes unable to move any more. As a result, the accessor device 140 will not give in to the force of pulling out the data cartridge or the force of returning it. That is to say, with the top plate 145 of the accessor device 140 being guided, it is possible to prevent the accessor device 140 from collapsing.

As shown in FIG. 5, the top plate 145 of the accessor device 140 (more specifically, the edge face 146) is in a state of engaging with the channel part 102, which is formed by the top cover 110 and the side cover 120 of the library device 100. This channel part 102 is formed at the side surface part in the interior of the library device 100. This structure is provided in order to make the entirety of the library device 100 compact. Providing the channel part 102 at the upper surface part in the interior of the library device 100 is not preferable for making the device compact.

In this exemplary embodiment, the top plate 145 (cross-section) of the accessor device 140 has an L-shape rotated 180 degrees. The portion (cross-section) formed by the top cover 110 and the side cover 120 of the library device 100 has a channel shape. However, the structure may also be such that the top plate 145 is guided by both or either one of the top cover 110 and the side cover 120 of the library device 100, provided that it is capable of preventing the accessor device 140 from collapsing.

According to the exemplary embodiment of the present invention, it is possible, by only changing the component shape, to prevent collapsing of an accessor device, with almost no additional components. Moreover, with this type of collapse prevention for an accessor device being realized, the base and the post of the accessor device do not require much strength, and weight reduction can be achieved, while eliminating the need for using rigid materials. Furthermore, since the structure is such that the top plate of the accessor device engages with the channel part or the like formed by the top cover and the side cover of the library device, it is possible to achieve compaction and weight reduction of the entirety of the library device. Moreover, with the various effects described above, it is possible to inexpensively manufacture a library device, compared to ones conventionally available.

While the invention has been particularly shown and described with reference to the exemplary embodiment thereof, the invention is not limited to the embodiment. Various modifications that can be understood by those skilled in the art may be made to the configuration and the detail of the invention without departing from the scope of the invention.

This application is based upon and claims the benefit of priority from Japanese patent application No. 2011-078556, filed Mar. 31, 2011, the disclosure of which is incorporated herein in its entirety by reference.

INDUSTRIAL APPLICABILITY

The present invention may be applied to a library device and an accessor device. According to the library device and the accessor device to which the present invention is applied, it is possible to realize compaction and weight reduction of the library device, while stably performing operations of pulling out and returning a data cartridge.

REFERENCE SYMBOLS

100 Library device
110 Top cover
120 Side cover
140 Accessor device
145 Top plate
150 Drive device
160 Magazine
170 Magazine
200 Library device
240 Accessor device
250 Drive device
260 Magazine
280 Cell

The invention claimed is:

1. A library device comprising:
a housing comprising a substantially rectangular parallelepiped shape, the housing comprising a first surface and a second surface differing from the first surface, the first surface comprising a first track extending in a horizontal direction, the second surface comprising a second track parallel with the first track, the first and second surfaces being surfaces of outer walls, the outer walls defining the substantially rectangular parallelepiped shape of the housing, the first surface being a surface of a bottom wall of the outer wall; and
an accessor device that is provided within the housing, the accessor device comprising a first portion engaging with the first track, and a second portion engaging with the second track, the second portion being positioned above the first portion, the accessor device moving along the first track,
wherein the second track comprises an open top channel shape, a part of the second track being formed by the second surface, and
a bottom part of the channel shape is positioned directly under the second portion and is out of contact with the second portion.

2. The library device according to claim 1, wherein the first track is a regulating part that regulates a movement direction of the accessor device when the accessor device moves within the housing.

3. The library device according to claim 1, wherein the second portion comprises at least one shape of a set of a depression and a projection.

4. The library device according to claim 1, further comprising a friction prevention sheet that is attached on a portion of the second surface to be in contact with the second portion.

5. The library device according to claim 1, wherein the second surface is a side surface of the outer walls, the side surface being substantially perpendicular to the first surface.

6. The library device according to claim 1, further comprising:
a magazine that is provided within the housing and stores a plurality of data cartridges; and
a drive device that is provided within the housing,
wherein the accessor device inserts one of the data cartridges into the drive device, and
the drive device reads data from a recording medium within the inserted data cartridge.

7. The library device according to claim 1, wherein the second portion is provided above the first surface.

8. The library device according to claim 1, wherein the second portion comprises a plate shape and extends substantially parallel with the second surface.

9. An accessor device that is provided within a housing comprising a substantially rectangular parallelepiped shape, the housing comprising a first surface and a second surface differing from the first surface, the first surface comprising a first track extending in a horizontal direction, the second surface comprising a second track parallel with the first track, the accessor device moving along the first track, the first and second surfaces being surfaces of outer walls, the outer walls defining the substantially rectangular parallelepiped shape of the housing, the first surface being a surface of a bottom wall of the outer walls, the accessor device comprising:
  a first portion that engages with the first track; and
  a second portion that engages with the second track, the second portion being positioned above the first portion,
  wherein the second track comprises an open top channel shape, a part of the second track being formed by the second surface, and
  a bottom part of the channel shape is positioned directly under the second portion and is out of contact with the second portion.

10. The accessor device according to claim 9, wherein the second portion is provided above the first surface.

11. The accessor device according to claim 9, wherein the second portion comprises a plate shape and extends substantially parallel with the second surface.

* * * * *